(12) United States Patent
Welingkar et al.

(10) Patent No.: US 10,042,339 B2
(45) Date of Patent: Aug. 7, 2018

(54) CLOUD-SYNCHRONIZED ARCHITECTURE FOR A HOME AUTOMATION SYSTEM

(71) Applicant: Savant Systems, LLC, Hyannis, MA (US)

(72) Inventors: Bharat Welingkar, San Francisco, CA (US); Arthur A. Jacobson, Centerville, MA (US); Matt N. Gloier, Santa Clara, CA (US)

(73) Assignee: Savant Systems, LLC, Hyannis, MA (US)

( * ) Notice: Subject to any disclaimer, the term of this patent is extended or adjusted under 35 U.S.C. 154(b) by 304 days.

(21) Appl. No.: 14/875,399

(22) Filed: Oct. 5, 2015

(65) Prior Publication Data

US 2017/0097619 A1 Apr. 6, 2017

(51) Int. Cl.
*G05B 15/02* (2006.01)
*G06F 17/30* (2006.01)
(Continued)

(52) U.S. Cl.
CPC .......... *G05B 15/02* (2013.01); *H04L 12/2816* (2013.01); *H04L 67/1095* (2013.01);
(Continued)

(58) Field of Classification Search
CPC . G05B 15/02; H04L 67/1095; H04L 12/2807; H04L 12/2816; H04L 2012/2841; G06F 17/30575
(Continued)

(56) References Cited

U.S. PATENT DOCUMENTS 7,287,062 B2   10/2007   Im et al.
7,464,035 B2 * 12/2008   Funk .................. H04L 12/2803
                                                                704/270
(Continued)

FOREIGN PATENT DOCUMENTS

DE    102013106119 A1    12/2014

OTHER PUBLICATIONS

"Notification of Transmittal of the International Search Report and the Written Opinion of the International Searching Authority, or the Declaration," International Filing Date: Oct. 4, 2016, International Application No. PCT/US2016/055327, Applicant: Savant Systems, LLC., dated Dec. 12, 2016, pp. 1-13.
(Continued)

*Primary Examiner* — Ryan D. Coyer
(74) *Attorney, Agent, or Firm* — Cesari and McKenna, LLP; James A. Blanchette (57) ABSTRACT

An architecture for a home automation system is provided that utilizes a home database stored in an in-home host controller that is synchronized with a configuration database maintained by remote cloud services. In one example embodiment, the home database of the host controller is synchronized over the Internet with the configuration database of cloud services. When there is connectivity between a mobile app used to configure and/or control the home automation system and the host controller via an in-home LAN, data interactions related to the home automation system are performed between the mobile app and the home database over the in-home LAN. When there is not this connectivity, data interactions related to the home automation system are performed between the mobile app and the configuration database over the Internet. If the host controller is reset or replaced, the home database may be restored by synchronization with the configuration database of cloud services.

20 Claims, 12 Drawing Sheets

(51) Int. Cl.
H04L 12/28 (2006.01)
H04L 29/08 (2006.01)

(52) U.S. Cl.
CPC .... *G06F 17/30575* (2013.01); *H04L 12/2807* (2013.01); *H04L 2012/2841* (2013.01)

(58) Field of Classification Search
USPC ........................................................ 700/275
See application file for complete search history.

(56) References Cited

U.S. PATENT DOCUMENTS

| | | | |
|---|---|---|---|
| 7,551,071 B2 | 6/2009 | Bennett et al. | |
| 8,180,735 B2 | 5/2012 | Ansari et al. | |
| 9,153,125 B2 | 10/2015 | Madonna et al. | |
| 9,183,163 B2 | 11/2015 | Frei et al. | |
| 2007/0143801 A1 | 6/2007 | Madonna et al. | |
| 2008/0127063 A1* | 5/2008 | Silva | H04L 12/2809 717/107 |
| 2012/0154138 A1* | 6/2012 | Cohn | G08B 25/14 340/501 |
| 2012/0331156 A1* | 12/2012 | Colpitts | H04L 12/2818 709/227 |
| 2013/0283025 A1 | 10/2013 | Madonna et al. | |
| 2014/0266717 A1* | 9/2014 | Warren | G06Q 10/20 340/540 |
| 2015/0341184 A1 | 11/2015 | Tatzel et al. | |
| 2015/0341227 A1* | 11/2015 | Tatzel | H04L 41/22 715/736 |

OTHER PUBLICATIONS

U.S. Appl. No. 14/339,864, filed Jul. 24, 2014 by Arthur A. Jacobson et al. for Residential Management System for Use With a Plurality of Home Automation Systems, pp. 1-32.

U.S. Appl. No. 14/875,254, filed Oct. 5, 2015 by Arthur A. Jacobson et al. for Wireless Provisioning and Configuring of Hardware Elements of a Home Automation System, pp. 1-47.

\* cited by examiner

FIG. 5C client_platform
- id INT(11)
- manufacturer VARCHAR(64)
- device_type VARCHAR(64)
- model VARCHAR(64)
- model_version VARCHAR(32)
- os VARCHAR(64)
- os_version VARCHAR(32)
- indexes client
- id VARCHAR(32)
- unique_device_id VARCHAR(160)
- user_id VARCHAR(32)
- client_platform_id INT(11)
- dev_build TINYINT(1)
- sns_endpoint_arn VARCHAR(1000)
- device_ip VARCHAR(45)
- created DATETIME
- updated DATETIME
- signed_out TINYINT(1)
- indexes integrator_organization
- id INT(11)
- salesforce_id VARCHAR(32)
- name VARCHAR(256)
- email VARCHAR(256)
- country VARCHAR(256)
- created DATETIME
- indexes user
- id VARCHAR(32)
- salesforce_id VARCHAR(45)
- email VARCHAR(256)
- password VARCHAR(64)
- first_name VARCHAR(64)
- last_name VARCHAR(64)
- image_url_info VARCHAR(1024)
- phone VARCHAR(32)
- email_verification_date DATETIME
- is_and_or_accepted TINYINT(4)
- email_newsletter TINYINT(4)
- deleted TINYINT(4)
- created DATETIME
- profile_pic_url VARCHAR(1024)
- indexes host_audit_()
- id INT(11)
- admin_user VARCHAR(256)
- home_id VARCHAR(32)
- host_url VARCHAR(32)
- action VARCHAR(256)
- integrator_organization_id INT(11)
- license_pid VARCHAR(64)
- license_code VARCHAR(64)
- created DATETIME
- indexes

CLOUD-SYNCHRONIZED ARCHITECTURE FOR A HOME AUTOMATION SYSTEM

BACKGROUND

Technical Field

The present disclosure relates generally to home automation systems, and more specifically to an architecture for a home automation system that utilizes cloud synchronization.

Background Information

Home automation systems are becoming increasingly popular in both residential and commercial settings. Such systems may be capable of controlling, switching data between, and otherwise interacting with a wide variety of devices, including lighting devices, security devices, audio/video (A/V) devices, heating ventilation and cooling (HVAC) devices, and/or other types of devices.

Generally, in order to utilize the capabilities of a home automation system, a configuration procedure must be undertaken. During configuration a user may provide certain configuration information for devices that is required to enable services, define various scenes that, when activated, control devices in a predefined manner, define various triggers that activate services or scenes in response to predetermined events, and the like. Such information may be stored as part of a system configuration in internal storage of a controller of the home automation system. Additional information that is generated during ongoing operation of the system may also be stored in internal storage of the controller. For example, system state information may be maintained that describes a current condition of devices of the home automation system and the controller itself.

Traditionally, should the controller undergo a failure, requiring it to be reset (e.g., factory reset) or replaced with a new unit, the system configuration and any other information maintained in its internal storage will be lost. The user (or a paid installer) may be required to entirely reconfigure the system, again providing configuration information for devices, defining scenes, etc. in order to restore operation.

Further, during normal operation, a user of a traditional home automation system typically controls the system using a user interface (UI) presented on an in-home device (e.g., a remote control) that communicates with the controller over a wireless connection (e.g., infrared (IR), radio frequency (RF), local area network (LAN), etc.). The in-home device may access and/or modify at least some of the information stored within the controller, to enable the user to control services, activate and/or modify scenes, and perform other types of interactions with the system. Typically, however, such in-home devices (e.g., remote controls) are not usable when remote from the home.

While some home automation systems provide remote control on a mobile device, they typically suffer a number of shortcomings. In general, the user experience when in home, and when remote, is significantly different, such that both different functionality is provided, and any similar functionality is presented with a significantly different visual appearance. Further, the architecture used to provide remote control may introduce operational shortcomings. Some architectures allow direct access over the Internet from the mobile device to the controller, through any firewall that may be operating to protect an in-home network to which the controller may be coupled. This sort of direct access may introduce unwanted security vulnerabilities. Other architectures move information storage entirely to the cloud, such that the mobile device communicates exclusively with a cloud-based application over the Internet, which in-turn communicates over the Internet with devices of the home automation system. However, this sort of complete cloud control may introduce unwanted latency and unreliability. Even when a mobile device is disposed in the home, and has access to a high-speed in-home network, such architectures generally still route messages over the Internet back to the cloud, adding delay to any information exchange. Likewise, should Internet connectivity be lost, the user may be unable to interact with the home automation system, even when in the home and having connectivity to the in-home network.

Accordingly, there is a need for a new architecture for a home automation system that may provide protection against data loss, and allow for more effective and efficient remote control than available in previous architectures.

SUMMARY

An example cloud-synchronized architecture is provided that utilizes a home database stored in an in-home host controller that is synchronized with a configuration database maintained by remote cloud services. A mobile application (app) executing on a mobile device may interact with the host controller over an in-home LAN (e.g., a Wi-Fi network) while in the home (e.g., when there is connectivity to the in-home LAN), and with cloud services when remote (e.g., when there is no connectivity to the in-home LAN, but there is Internet connectivity), providing ubiquitous access to the home automation system. Redundancy may be provided, such that in the event of a reset or a replacement of the host controller, the home database may be restored from the configuration database maintained by cloud services. Enhanced responsiveness and reliability may be achieved when in the home, as use of the in-home LAN may reduce latency and ensure communication despite any Internet-connectivity issues. Further, a secure gateway into the home may be provided when remote, minimizing in-home network vulnerability.

In one example embodiment, a host controller of a home automation system maintains a home database that stores at least one of configuration information used for providing services involving one or more hardware elements of the home automation system, scenes that are configured in the home automation system, or system state information indicating a present condition of one or more hardware elements of the home automation system. The host controller synchronizes the home database with a configuration database of cloud services over the Internet. When there is connectivity between a mobile application (app) executing on a mobile device used to configure and/or control the home automation system and the host controller via the in-home LAN, data interactions related to the home automation system are performed between the mobile app and the host controller over the in-home LAN. When there is no connectivity between the mobile app and the host controller via the in-home LAN, data interactions related to the home automation system are performed between the mobile app and the cloud services over the Internet.

In an alternative embodiment, the host controller of the home automation system maintains a home database that stores at least one of configuration information used for providing services involving one or more hardware elements of the home automation system, scenes that are configured in the home automation system, or system state information indicating a present condition of one or more hardware elements of the home automation system. The host controller synchronizes the home database with a configuration database of cloud services over the Internet. Subsequently, the host controller may be reset or fail and be replaced. Software of cloud services detects that the host controller has been reset or replaced, and restores the home database of the reset or replaced host controller by synchronizing the configuration database of cloud services with the home database over the Internet.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "home automation system" should be interpreted broadly to encompass various types of home control, "smart home", and/or device control systems that may control devices (e.g., lighting devices, security devices, A/V devices, HVAC devices, electronic door locks, and/or other types of devices) within a home. A home automation system may control a variety of different types of devices, or devices of only a particular type (e.g., only lighting devices, only A/V devices, etc.).

As used herein, the term "home" should be interpreted broadly to encompass various types of residential and commercial structures. To be considered a "home", a structure need not be a domicile.

As used herein, the term "mobile device" refers to an electronic device that executes a general-purpose operating system and is adapted to be transported on one's person. Devices such as smartphones and tablet computers should be considered mobile devices. Desktop computers, servers, or other primarily-stationary computing devices generally should not be considered mobile devices.

As use herein, the term "service" refers to an activity offered by a home automation system that involves interactions between one or more devices of a home automation system. A service may, but need not, correspond to one or more unique paths between devices that are used to provide the activity (e.g., audio and video paths from source devices to output devices). An example of a service may be a "Cable TV" service that corresponds to paths between a cable box and a television, which are utilized to provide a cable television viewing activity.

As used herein, the term "scene" refers to a set of instructions that, when activated, control one or more devices of a home automation system in a predefined manner. An example of a scene may be a "Wake Up" scene that sets lighting devices to predefined levels, and plays particular media content on A/V devices, in accordance with a user's morning wake up preferences. A scene may be defined during initial configuration of the home automation system, or at a later time.

As use herein, the term "room" refers to an interior portion of a home or an exterior space associated with a home, in which one or more services may be provided. A room may correspond to a single physical room, an aggregation of multiple physical rooms, a sub-portion of a physical room, or a particular delineation of exterior space.

As used herein, the term "hardware element" refers to a physical hardware unit that may be a part of a larger system, such as a home automation system. Hardware elements of a home automation system may include a host controller of the home automation system and devices of the home automation system, such as lighting devices, A/V devices, security devices, HVAC devices, electronic door locks, or other types of devices controlled by a host controller of the home automation system, or a remote control used to control the host controller.

An Example Home Automation System

Figure 1:
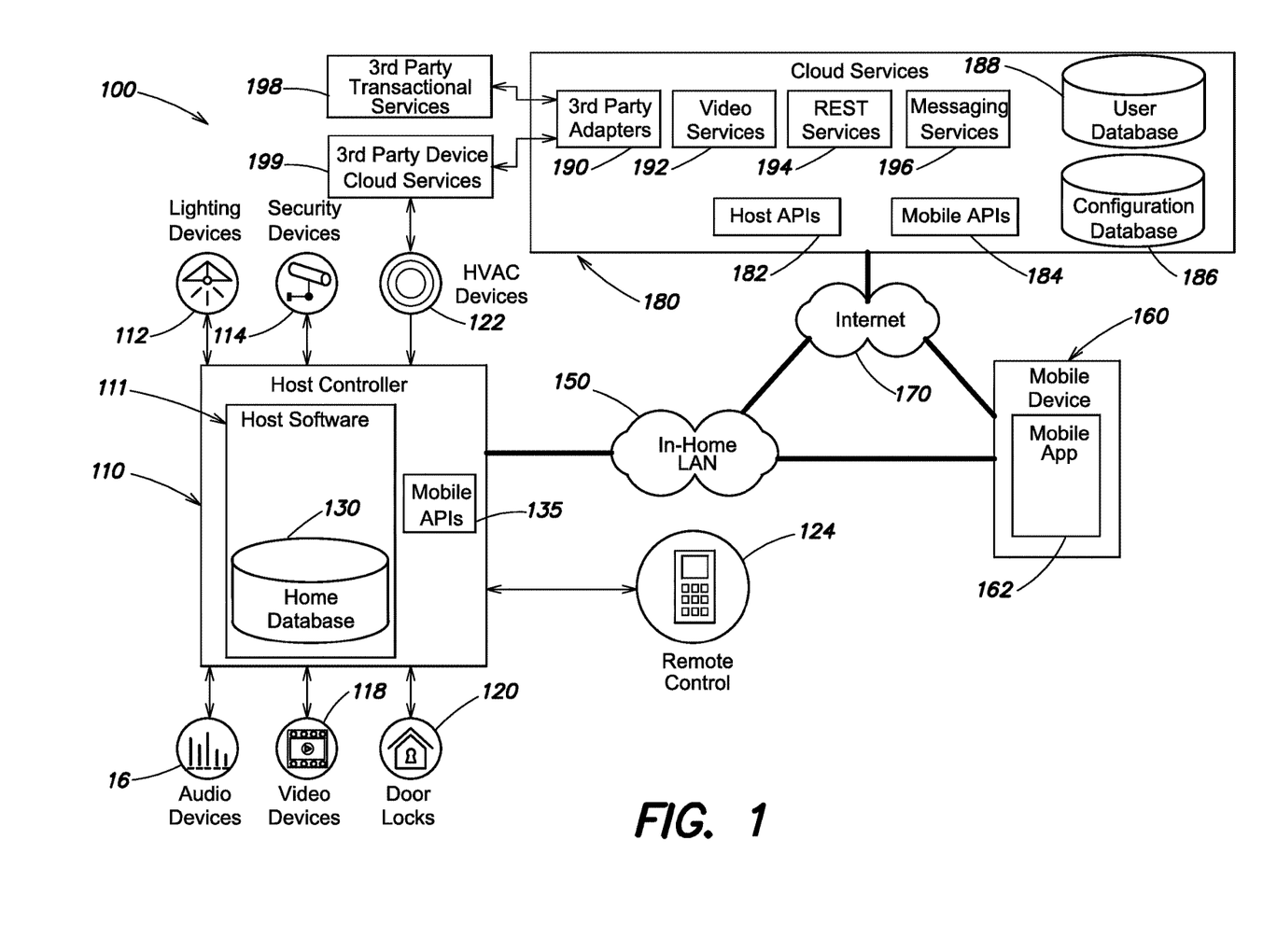
FIG. 1 is a block diagram of an example architecture of a home automation system operable to control devices.

FIG. 1 is a block diagram of an example architecture 100 of a home automation system operable to control devices. At the core of the system is a host controller 110 coupled to an in-home local area network (LAN) 150 (e.g., a Wi-Fi network). The host controller 110 may include hardware components such as a processor, a memory, a storage device, a LAN interface (e.g., Wi-Fi interface), and a WPAN interface (e.g., BLE interface), as well as other hardware components. The storage device may store host software 111 that when executed may implement parts of the below described techniques for cloud-synchronization. The host software 111 may also locally monitor and control the operations of devices, provide system administrative services, provide activity recording, and perform other functions. The storage device may further store mobile application program interfaces (APIs) 135 that are used to support communications over the in-home LAN 150 with a mobile app 162. Still further, the storage device may store a home database 130 configured to maintain a system configuration as well as other information, including scenes that are configured in the home automation system, system state information indicating a present condition of devices of the home automation system, and the like.

The devices 112-122 of the home automation system may include lighting devices 112, such as lighting controllers, lamp modules, dimmer modules, switches, keypads, fan controllers and the like; security devices 114, such as cameras/home monitors, motion sensors, home healthcare sensors, related controllers and the like; audio devices 116 and video devices 118 (collectively A/V devices), such as A/V device controllers, infrared (IR) blasters, matrix switchers, media servers, audio amplifiers, cable boxes, televisions, and the like; electronic door locks 120 and other types of motor or relay operated devices; HVAC devices 122, such as thermostats; as well as other types of devices. Further a remote control 124 may be provided. The remote control may offer a home automation control UI, in which a user can provide input to cause the host controller 110 to issue control commands to device 112-122. For purposes of the discussion herein, the remote control 124 may be considered a device of the home automation system.

Depending on the implementation, the communications capabilities of the devices 112-124 of the home automation system may vary. For example, at least some of the devices may include both a LAN interface (e.g., a Wi-Fi interface) and a WPAN interface (e.g., a BLE interface) to enable them to communicate with the host controller 110 and other devices via the in-home LAN 150 or WPANs (e.g., BLE). Likewise, some of the devices may include only a LAN interface (e.g., a Wi-Fi interface) to communicate with the host controller 110 and other devices over the in-home LAN 150. Still other devices may only have ports or transceivers for wired or point-to-point wireless communication (e.g., RS-232 ports, infrared (IR) transceivers, relay control ports, general-purpose input/output (GPIO) ports, etc.) and communicate with the host controller 110 and other devices using such ports. Further, some devices may include a LAN interface (e.g., a Wi-Fi interface), but not be configured to communicate with the host controller 110 directly over the in-home LAN 150, but instead communicate first with third party device cloud services 199. It should be understood that while HVAC devices 122 are shown in FIG. 1 as an example of one type of device that may communicate in this manner, other types of devices may alternatively use this method of communication, and vice versa.

The communication may be used to, among other things, implement services and scenes selected by a user in the home automation control UI provided on the remote control 124, which is typically used only in the home. To control services and scenes when either in the home or remote, the home automation system may utilize a mobile device 160. The mobile device 160 may include hardware components such as a processor, a memory, a storage device, a display screen (e.g., a touch sensitive display), a LAN interface (e.g., a Wi-Fi interface), a WPAN interface (e.g., a BLE interface), a cellular broadband interface (e.g., a 4G Long-Term Evolution (LTE) interface), as well as other hardware components. The mobile device 160 may execute a mobile app 162 that is configured to interact with the host controller 110 during provisioning using a WPAN (e.g., BLE), and at other times using the in-home LAN 150 (e.g., Wi-Fi), and that is configured to interact with cloud services 180 using the Internet 170 (via its cellular broadband interface or a LAN). The mobile app 162 may provide a configuration UI that may be used to provision the host controller 110 and the devices 112-124 of the home automation system (collectively, hardware elements), configure the hardware elements, define scenes, and the like. The mobile app 162 may further provide a home automation control UI that may be used during ongoing operation of the home automation system to control services, activate already defined scenes, and the like.

Cloud services 180 may provide host APIs 182 that support communication with the host controller 110, and mobile APIs 184 that support communication with the mobile app 162. As disused in more detail below, a configuration database 186 is maintained by cloud services 180, that stores a system configuration of the home automation system, as well as additional information, and is synchronized with the home database 130 of the host controller 110. Further, cloud services 180 may maintain a user database 188 that is the primary storage location for user data and permissions related to the home automation system. Various service platforms, including video services 192, Representational State Transfer (REST) services 194 and messaging services 196, among others, may be utilized to provide access to media content, synchronization and remote access, event notifications, and user identity management, among other functions. Third party adaptors 190 may provide interfaces to third party transactional services 198 (e.g., that may manage mail, crash logs, analytics, payments, consent metadata, licensing, payment, etc.), as well as third party device cloud services 199 that may interact directly with certain devices 122 of the home automation system, as discussed above.

System Configuration Generation and Storage in Home Database

Figure 2:
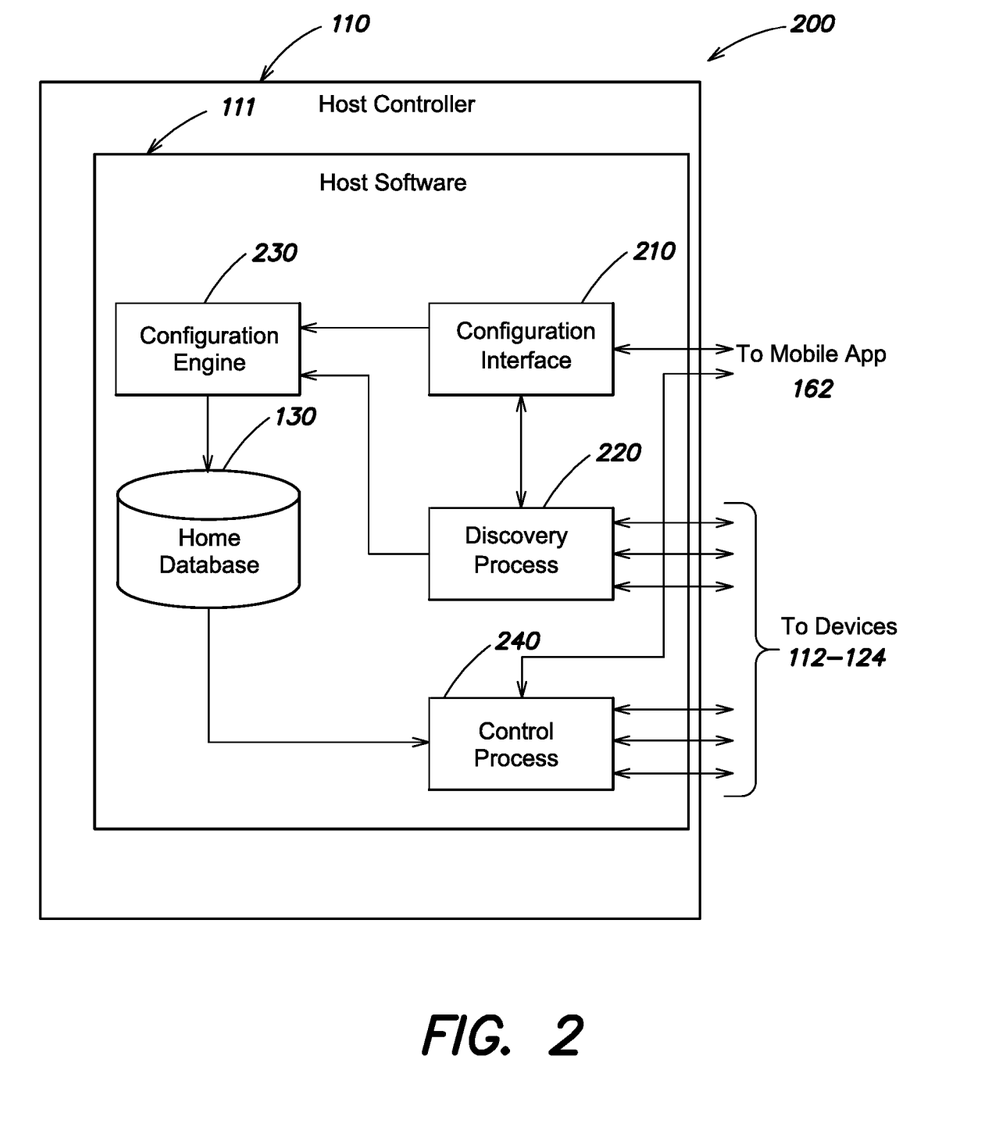
FIG. 2 is a block diagram illustrating software processes of host software on a host controller that may be used to build a system configuration stored in a home database.

FIG. 2 is a block diagram 200 illustrating software processes of host software 111 on the host controller 110 that may be used to build a system configuration stored in the home database 130. A configuration interface 210 may receive user-provided configuration information (e.g., a room with which a device is associated, one or more interconnections to other devices, etc.) from a configuration UI presented by the mobile app 162. Further, discoverable configuration information may be determined by discovery process 220 via WPAN (e.g., BLE) or in-home LAN 150 communication with devices 112-124. The configuration information may be conveyed from the configuration interface 210 and the discovery process 220 to a configuration engine 230. The configuration engine 230 may use the configuration information to generate or update a system configuration that provides a complete view of the home automation system. The system configuration may be stored in the home database 130, along with other information describing services that are enabled by the system configuration, scenes that are configured in the home automation system, system state information indicating a present condition of the home automation system, etc.

During ongoing operation of the home automation system, the user may use a home automation control UI provided by the mobile app 162 that communicates with a control process 240 on the host controller 110. The control process 240 may determine user intent, and thereafter issue appropriate control commands to devices 112-122 to activate services, scenes, etc., enabled by the system configuration.

Figure 3:
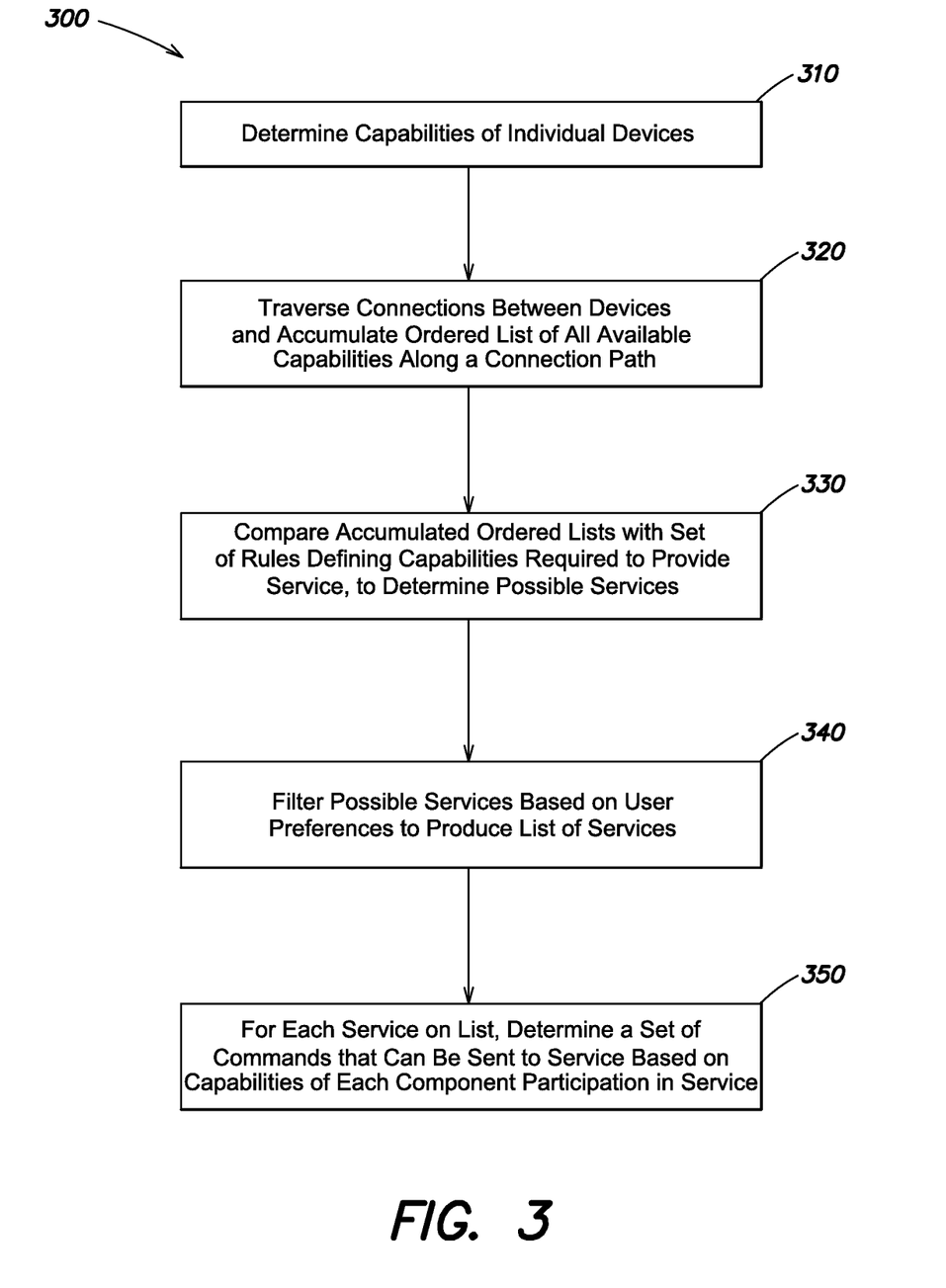
FIG. 3 is a flow diagram of an example sequence of step that may be executed by the configuration engine to enable services for a system configuration.

FIG. 3 is a flow diagram of an example sequence of step 300 that may be executed by the configuration engine 230 to enable services for a system configuration. At step 310, upon the receipt of configuration information for devices 112-124 of the home automation system, the configuration engine 230 may determine capabilities of each individual device (e.g., by reference to a device profile for that type of device). At step 320, based on indications of interconnections between devices, the configuration engine 230 may accumulate an ordered list of all available capabilities along a connection path through the home automation system. At step 330, the configuration engine 230 may compare accumulated ordered lists with a set of rules defining capabilities required to provide services, and based on matches, determine a list of possible services that can be provided by the home automation system. At step 340, the configuration engine 230 may filter the list of possible services based on user preferences (e.g., provided by a user into the configuration UI of the mobile app 162), to produce a list of services. Then, at step 350, for each service on the list, the configuration engine 230 may determine a set of commands that can be sent to the services based on capabilities of each component. The list of services and the list of commands may be stored in the home database 130.

Figure 4:
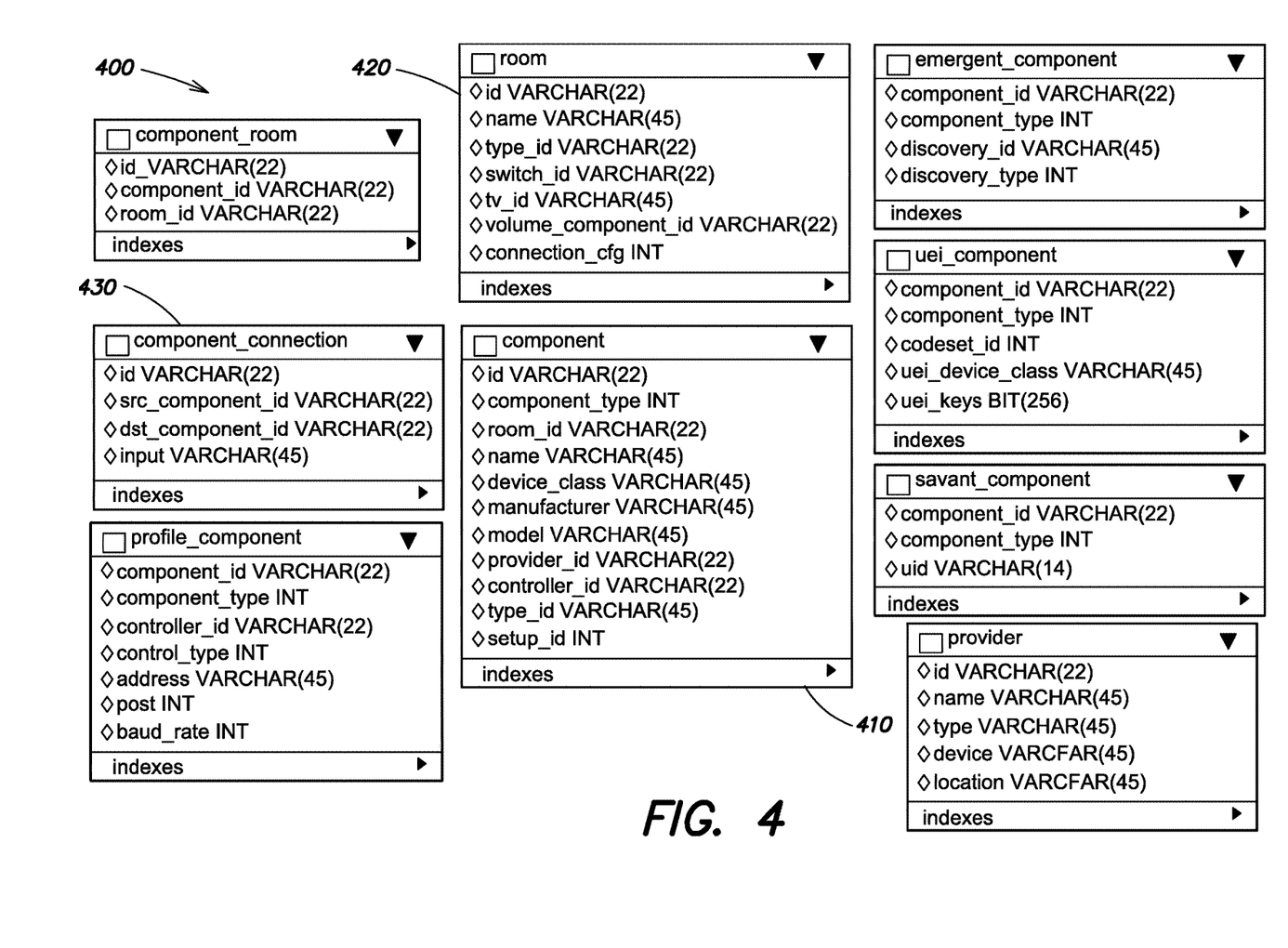
FIG. 4 is an example partial schema of a home database, illustrating an example of how portions of a system configuration may be maintained.
Figure 5A:
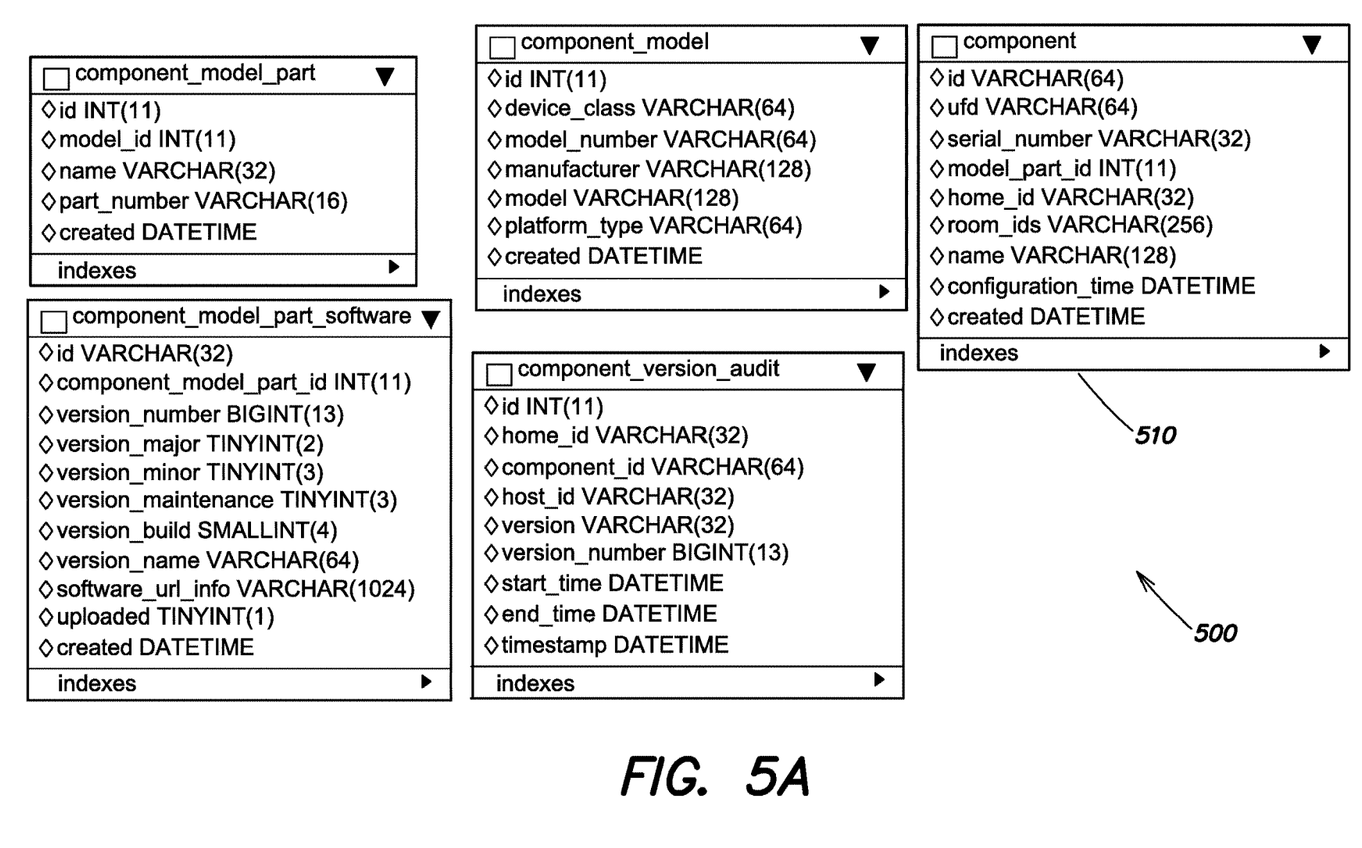
FIGS. 5A-D are an example partial schema of a configuration database and user database, illustrating an example of how a system configuration, as well as other information such as user data, may be remotely maintained.
Figure 5B:
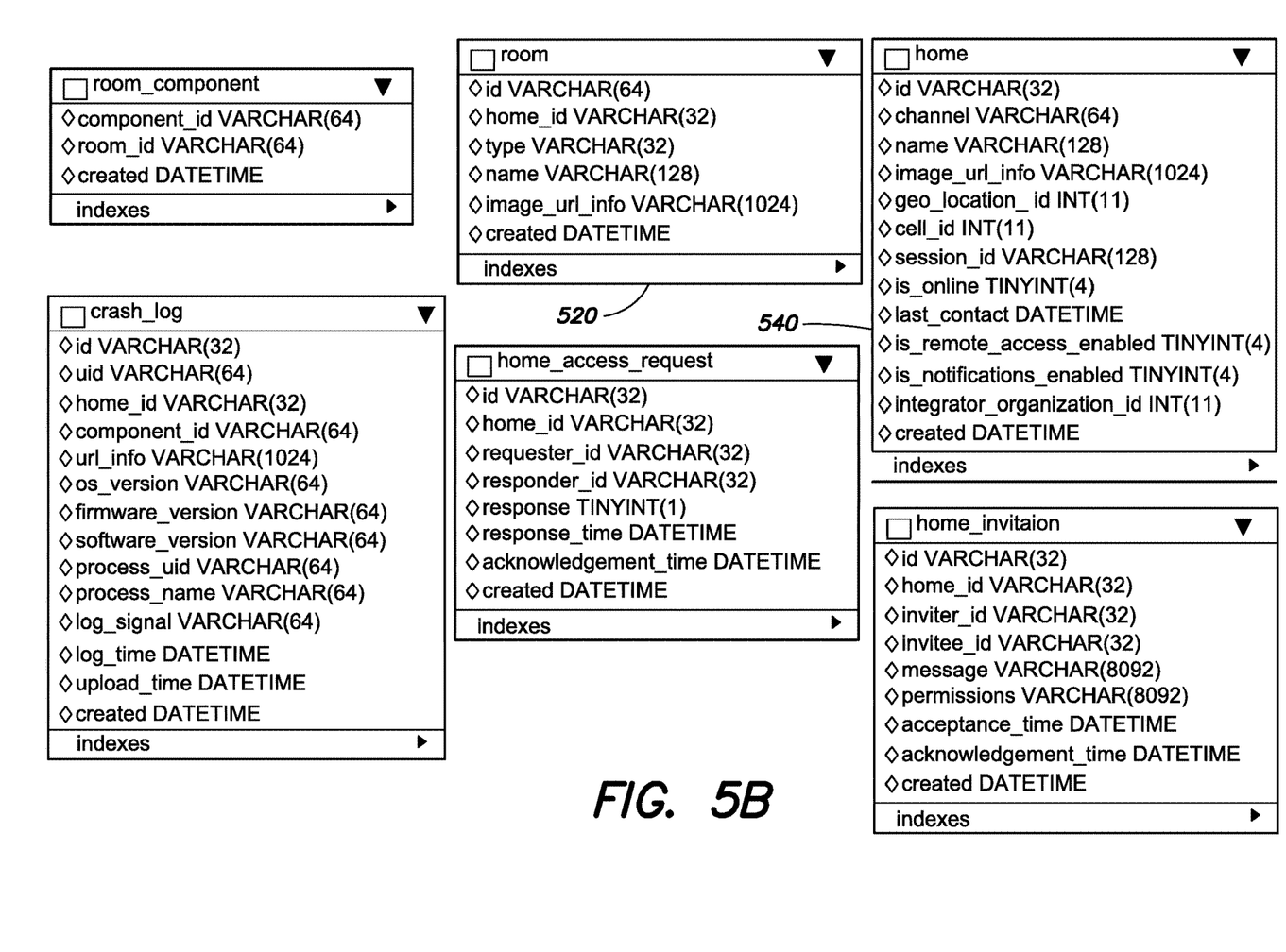
Figure 5C:
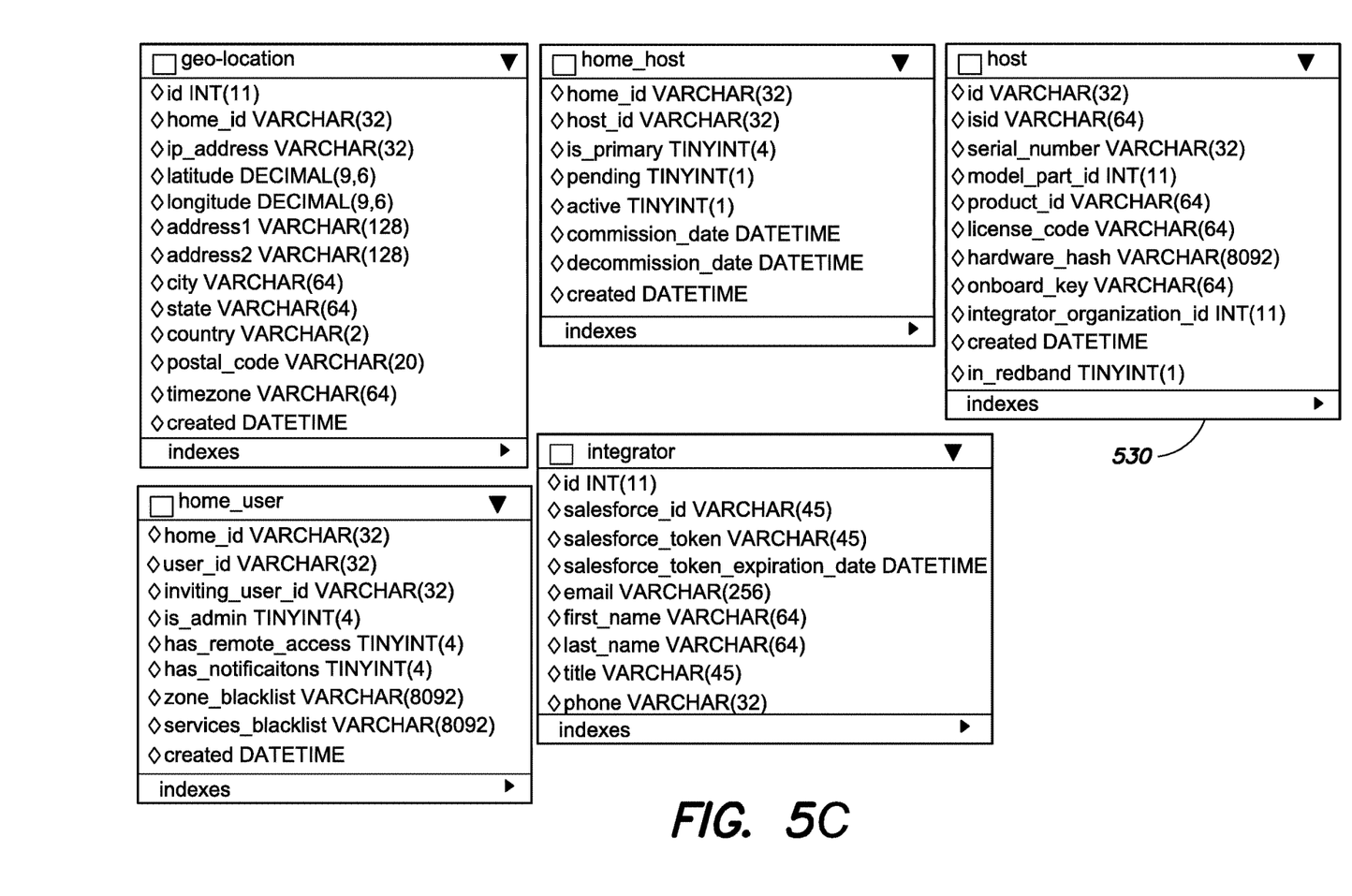
Figure 5D:
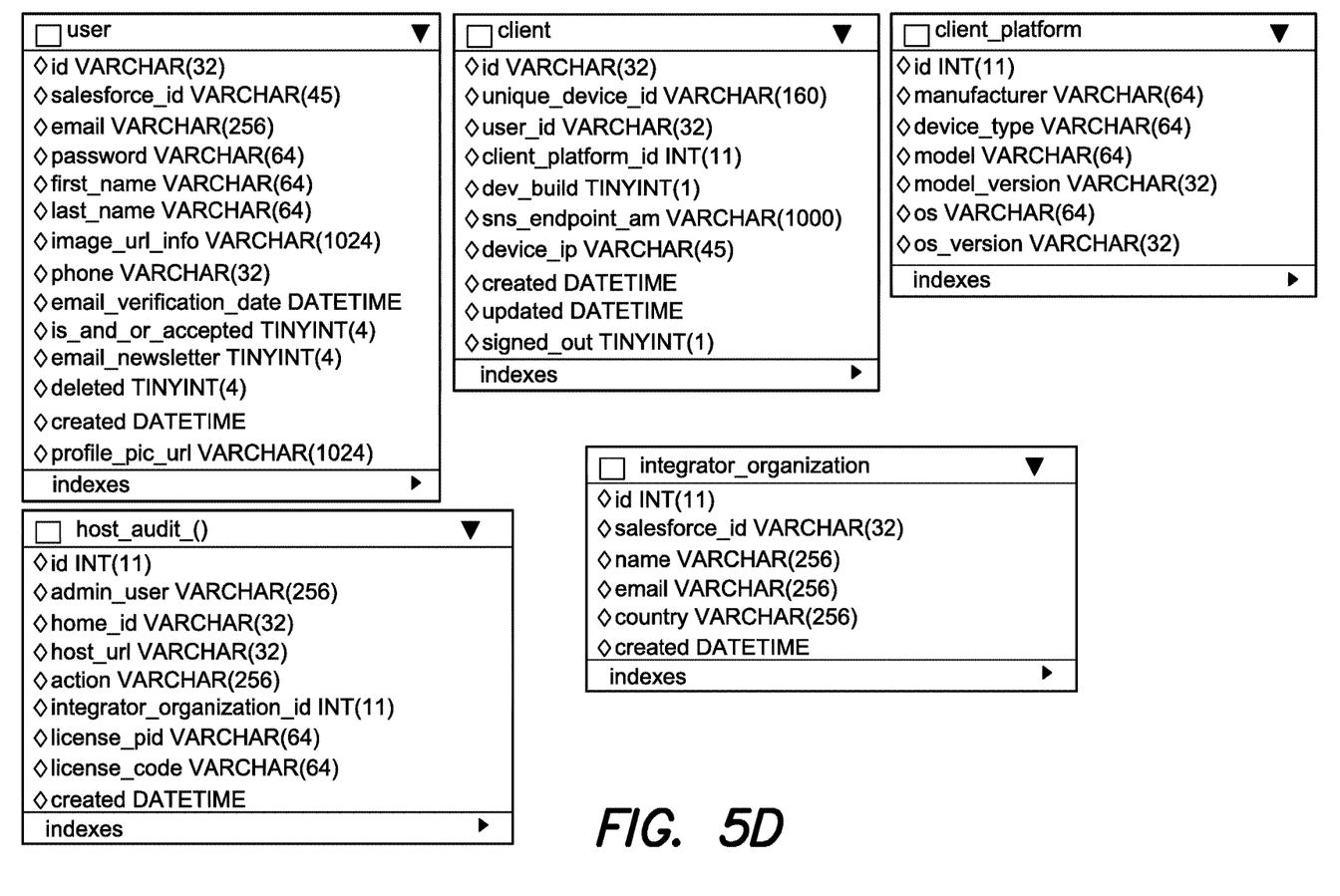

FIG. 4 is an example partial schema 400 of a home database 130, illustrating an example of how portions of the system configuration may be maintained. Relationship links have been omitted in this example. The schema 400 includes a number of entities. For example, a component entity 410 may represent a device 112-124 of the home automation system, and may include attributes describing a name and type of the device, a room with which the device is associated, a manufacture and model of the device, and a host controller controlling the devices, etc. A room entity 420 may represent a room with which the device is associated, and may include attributes such as a name and type of the room, a switching device associated with the room, and a display device associated with the room, etc. Further, a component connection entity 430 may represent a connection between the device and another device of the home automation system, and may include attributes such as a source identifier and a destination identifier, among other. A variety of other entities may also be provided in the schema 400.

Cloud Synchronization and Remote Access

The host controller 130 may synchronize the home database 130, including the system configuration, with the configuration database 186 of cloud services over the Internet 170. By creating a persistent remote backup, the home database may be restored in the event of a reset (e.g., factory reset) of the host controller 110, or a failure and replacement of the host controller with a new unit.

FIGS. 5A-D are an example partial schema 500 of a configuration database 186 and user database 188, illustrating an example of how the system configuration, as well as other information such as user data, may be remotely maintained. Relationship links have been omitted in this example. The schema 500 includes a number of entities for storing the home configuration, for example, a component entity 510 and a room entity 520, which directly correspond to entities maintained in the home database 130. The schema 500 may also include entities that expand upon the information maintained in the home database, such as a host entity 530 that represents the host controller 110 of the home automation system, and a home entity 540 that represents a home associated with the home automation system. Further, the schema 500 may include entities that store user data describing users of the home automation system and their permissions, for example, a user entity 550. A variety of other entities may also be provided in the schema 500.

Figure 6:
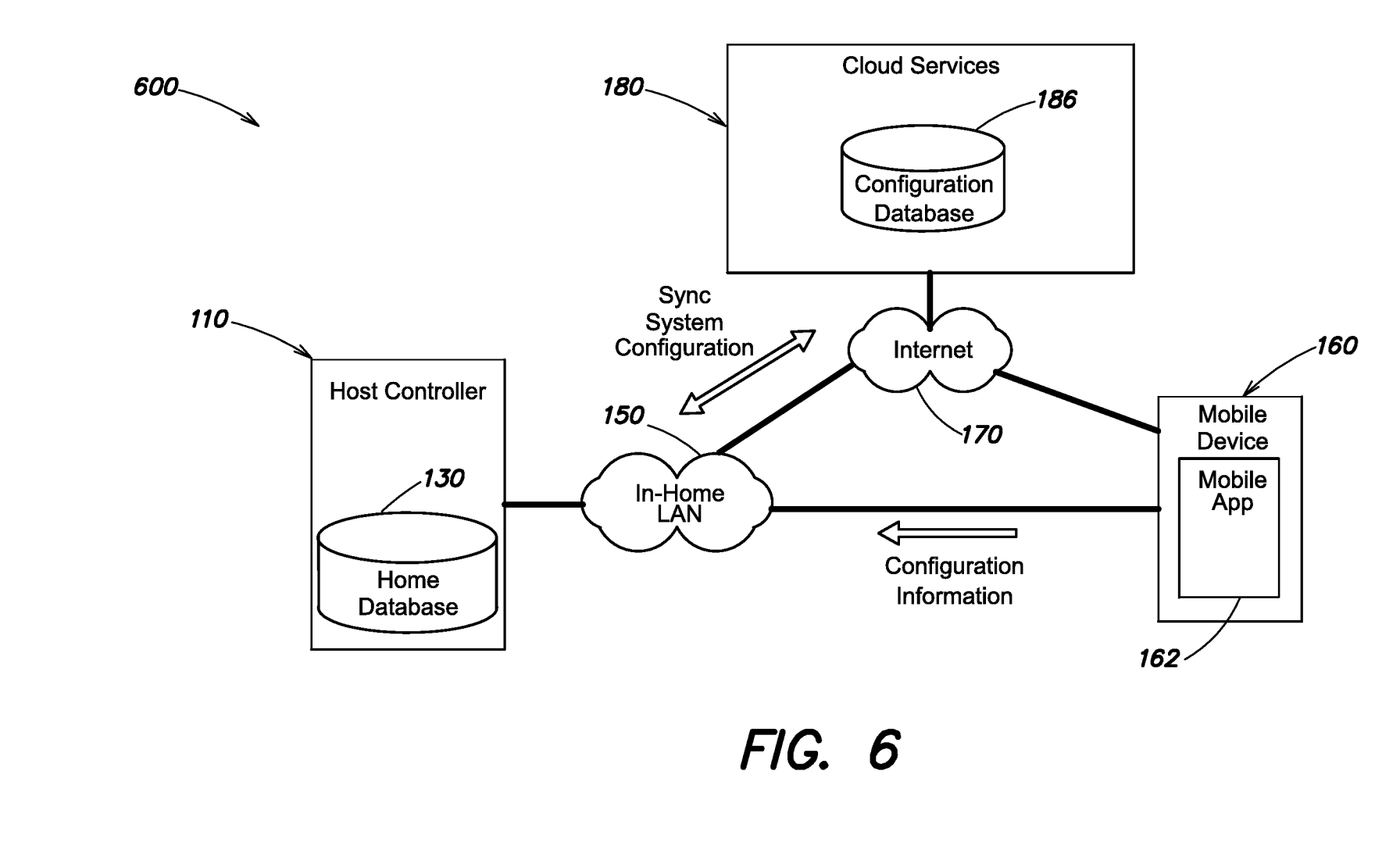
FIG. 6 is a diagram illustrating an example synchronization of a system configuration between a home database of a host controller and a configuration database of cloud services.

FIG. 6 is a diagram 600 illustrating an example synchronization of a system configuration between the home database 130 of the host controller 110 and the configuration database 186 of cloud services 180. Configuration information used to build or update the system configuration may initially be received from the mobile app 162 over the in-home LAN 150 (e.g., via a WebSocket connection) and used by the host controller 110 to build or update the system configuration maintained in the home database 130. After this operation, the home database 130 may be synchronized with the configuration database 186 over the Internet 170 (e.g., using REST). Should additional updates be made to the system configuration, a similar synchronization may be performed so both the home database 130 and the configuration database 186 remain in sync. At some subsequent time, the host controller 110 may experience a failure that requires it to be reset (e.g., factory reset) or replaced with a new unit. In response to detecting a configuration database 130 that lacks a system configuration, the home database 130 may again be synchronized with the configuration database 186 over the Internet 170 (e.g., using REST), this time with data flowing in the opposite direction, to restore the system configuration in the home database 130.

In addition to allowing for restoration of a system configuration in failure scenarios, synchronization between the home database 130 and the configuration database 186 may facility other types of data interactions with the home automation system, providing ubiquitous access when in the home (e.g., having connectivity to the in-home LAN 150), and when remote (e.g., lacking connectivity to the in-home LAN 150, and using the Internet 170). Likewise, responsiveness and reliability may be enhanced over pure-cloud solutions, as in-home operations may be performed absent Internet messaging delay, and may proceed independent of Internet connectivity status. Still further, security may be enhanced over solutions that allow direct Internet access to a host controller, as cloud services may provide a single secure gateway for access to hardware elements of the home automation system.

Figure 7:
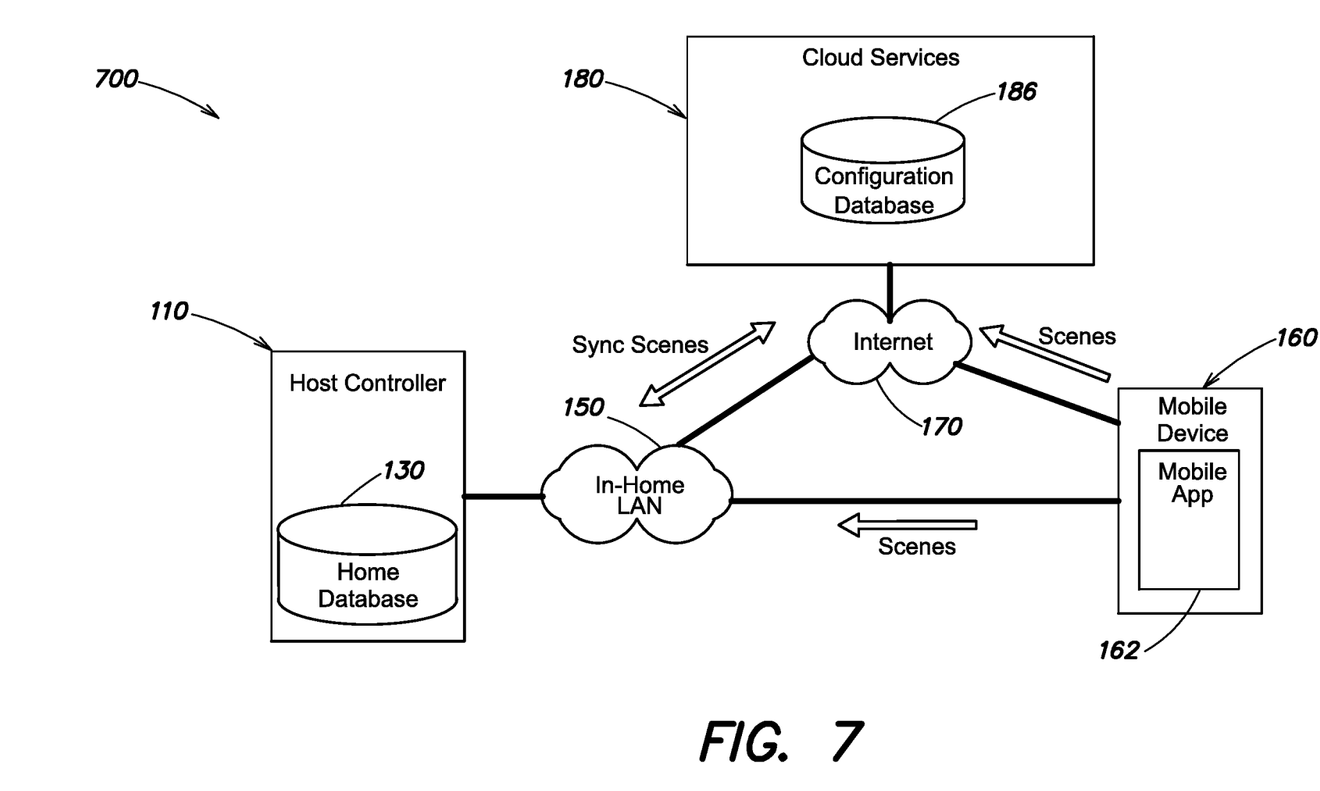
FIG. 7 is a diagram illustrating an example of defining scenes in a home automation system from a mobile app when in the home and when remote.

FIG. 7 is a diagram 700 illustrating an example of defining scenes in the home automation system from the mobile app 162 when in the home (e.g., having connectivity to the in-home LAN 150), and when remote (e.g., lacking connectivity to the in-home LAN 150, and using the Internet 170). When in the home, scenes may be received from the mobile app 162 over the in-home LAN 150 at the host controller 110 (e.g., via a WebSocket connection) and stored in the home database 130. The home database 130 may then be synchronized with the configuration database 186 over the Internet 170 (e.g., using a WebSocket connection), such that both have an identical library of available scenes. When remote, scenes may be received from the mobile app 162 over the Internet 170 at cloud services 180 and stored in the configuration database 186. The configuration database 186 may then be synchronized with the home database 130 over the Internet 170 (e.g., using the WebSocket connection). In both cases, the user experience for defining scenes on the mobile app 162 may be identical, so that the user does not perceive an operational difference between being in the home (e.g., having connectivity to the in-home LAN 150) and being remote (e.g., lacking connectivity to the in-home LAN 150, and using the Internet 170).

Figure 8:
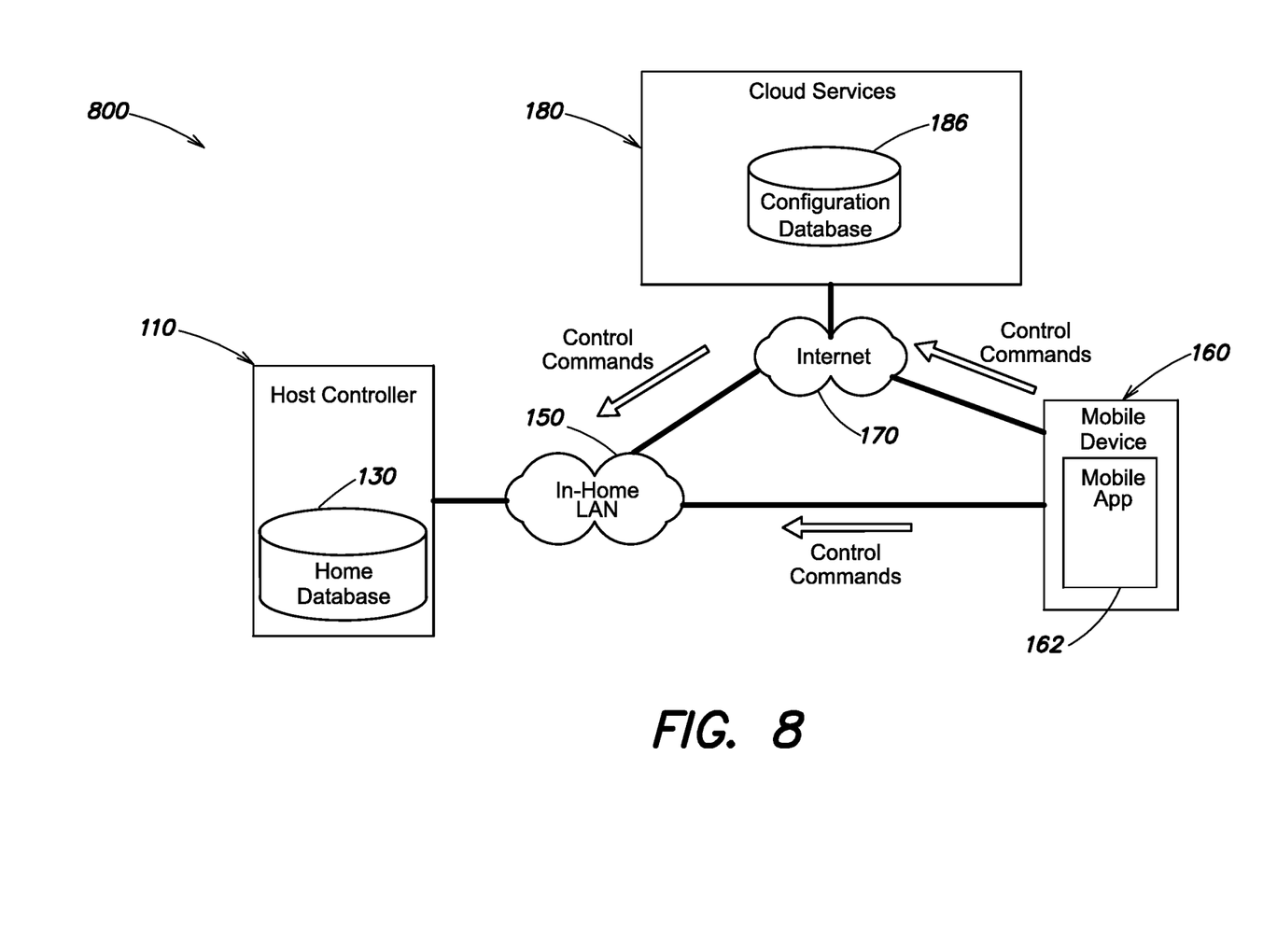
FIG. 8 is a diagram illustrating transmitting control commands from a mobile app to a host controller when in the home and when remote.

FIG. 8 is a diagram 800 illustrating transmitting control commands from the mobile app 162 to the host controller 110 when in the home (e.g., having connectivity to the in-home LAN 150), and when remote (e.g., lacking connectivity to the in-home LAN 150, and using the Internet 170). When in the home, control commands for activating, deactivating or otherwise interacting with services, scenes or other functionality of the home automation system may be issued (in response to user input in a home automation control UI) from the mobile app 162 over the in-home LAN 150 to the host controller 110 (e.g., via a WebSocket connection). The host controller 110 may then access the system configuration in the home database 130 to determine information related to executing the control command, and effect appropriate control over devices 112-122 to implement the service, scene or other functionality at issue. When remote, control commands may be received from the mobile app 162 over the Internet 170 at cloud services 180 (e.g., via a WebSocket connection). The control commands may then be forwarded to the host controller 110 over the Internet 170 (e.g., using a WebSocket connection), which operates in a similar manner. Again, from the perspective of the mobile app 162 the user experience may be identical, so that the user does not perceive an operational difference between being in the home (e.g., having connectivity to the in-home LAN 150) and remote (e.g., lacking connectivity to the in-home LAN 150, and using the Internet 170).

Figure 9:
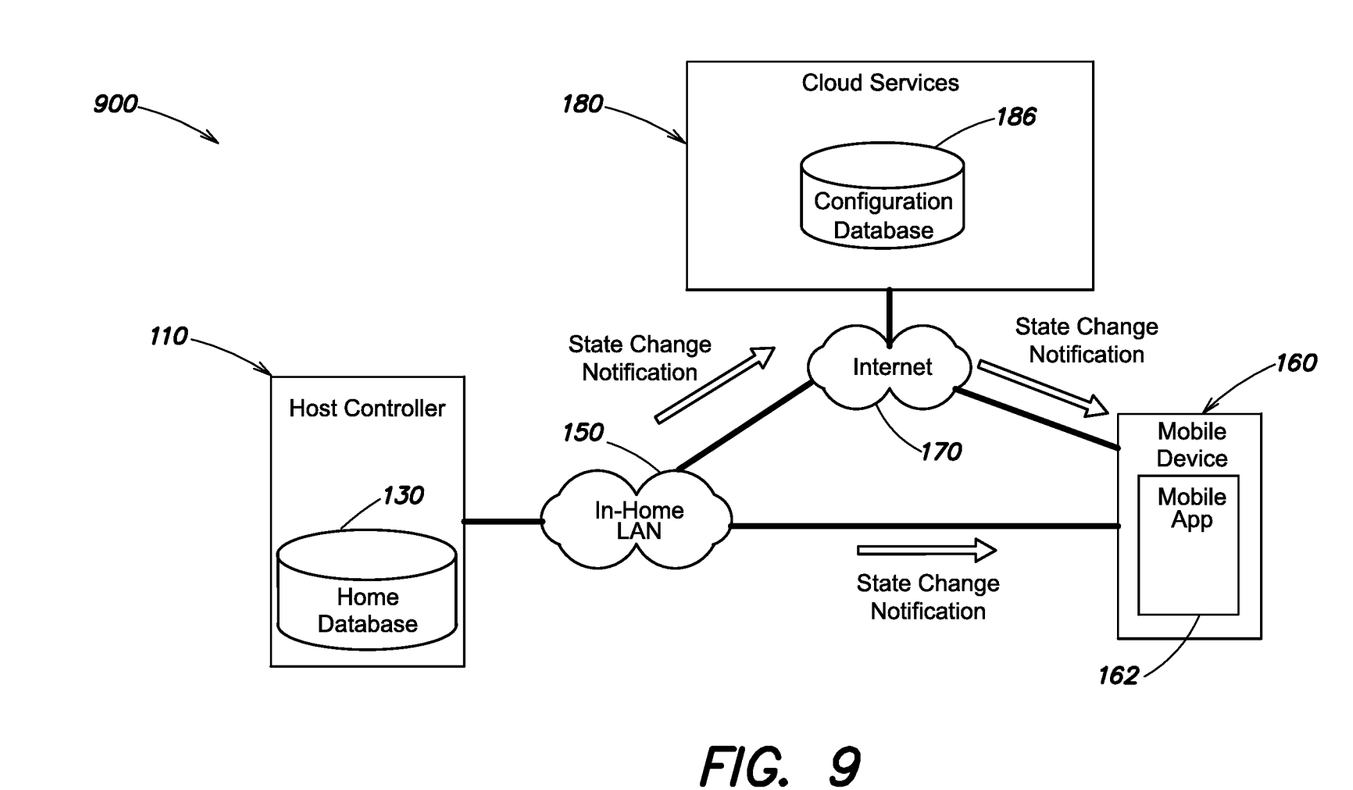
FIG. 9 is a diagram illustrating transmitting system state information indicating a present condition of one or more hardware elements of a home automation system from a host controller to a mobile app when in the home and when remote.

FIG. 9 is a diagram 900 illustrating transmitting system state information indicating a present condition of one or more hardware elements of the home automation system from the host controller 110 to the mobile app 162 when in the home (e.g., having connectivity to the in-home LAN 150), and when remote (e.g., lacking connectivity to the in-home LAN 150, and using the Internet 170). When in the home, system state information may be forwarded from the host controller 110 over the in-home LAN 150 to the mobile app 162 (e.g., via a WebSocket connection). When remote, system state information may be forwarded over the Internet 170 (e.g., via a WebSocket connection) to cloud services 180, and in turn forwarded by cloud services 180 over the Internet 170 (e.g., via a WebSocket connection) to the mobile app 162. Like the other types of data interactions, from the perspective of the mobile app 162 the user experience may be identical.

It should be understood that a wide variety of other types of in-home and remote data interactions may be facilitated by the cloud-enabled architecture described herein, to transfer information to the home automation system, or to transfer information from the home automation system to the mobile app 162 (e.g., for display in a control UI thereof). System configuration, scenes, control commands and system state information are merely examples of data interactions.

CONCLUSIONS

It should be understood that various adaptations and modifications may be made to the above discussed cloud-synchronized architecture for a home automation system. While embodiments discussed above may involve a home automation system that includes a variety of different types of devices, such as lighting devices, security devices, A/V devices, electronic door locks, HVAC devices, etc., it should be remembered that the techniques may be adapted for use with more limited types of home automation systems. For example, the techniques may be used with a home automation system that provides only lighting control (i.e., a lighting control system), a home automation system that provides only A/V control (i.e., an A/V control system), etc.

While it is discussed above that certain operations occur in a home or remote from a home, and that certain hardware elements are disposed in a home or remote from a home, it should be understood that the techniques are applicable to both residential and commercial installations, and that reference to a "home" encompasses various types of residential and commercial structures.

Still further, while it is discussed above that various software processes may execute on particular devices (such as on the host controller 110, mobile device 160, etc.). It should be understood that software processes may be executed on different hardware, including on cloud-based hardware as part of cloud services 180.

Additionally, it should be understood that at least some of the functionality described above to be implemented in software may be implemented in hardware. In general functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile or persistent memory, a hard-disk, a compact disk (CD), or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components, for example, processors, memories, etc. Above all, it should be understood that the above embodiments are meant to be taken only by way of example.

What is claimed is:

1. A method for operating a home automation system comprising
    maintaining, at a host controller of the home automation system that communicates with and issues control commands to a plurality of hardware elements of the home automation system, a home database that stores at least one of configuration information used for providing services involving the one or more hardware elements of the home automation system, scenes that are configured to use one or more hardware elements of the home automation system, or system state information indicating a present condition of one or more hardware elements of the home automation system;
    synchronizing the home database with a configuration database of cloud services over the Internet;
    when there is connectivity via an in-home local area network (LAN) between a mobile application (app) executing on a mobile device used to configure and/or control the home automation system by causing the host controller to issue control commands and the host controller, performing data interactions related to the home automation system between the mobile app and the home database of the host controller over the in-home LAN; and
    when there is no connectivity between the mobile app and the host controller via the in-home LAN, performing data interactions related to the home automation system between the mobile app and the configuration database of the cloud services over the Internet.

2. The method of claim 1, wherein the data interactions include providing control commands from the mobile app that control services involving one or more hardware elements of the home automation system.

3. The method of claim 1, wherein the data interactions include defining one or more scenes in the home automation system using the mobile app.

4. The method of claim 1, wherein the data interactions include receiving state change notifications at the mobile app describing a change in condition of one or more hardware elements of the home automation system.

5. The method of claim 1, wherein the data interactions include retrieving information for display in a home automation control user interface (UI) of the mobile app.

6. The method of claim 1, further comprising:
detecting the host controller has been reset or replaced; and
restoring the home database of the reset or replaced host controller by synchronizing the home database with the configuration database of the cloud services.

7. The method of claim 1, wherein the configuration information includes at least one of a room with which a hardware element is associated or one or more interconnections of the hardware element to other hardware elements.

8. The method of claim 1, further comprising:
configuring, by a configuration engine of the host controller, the home automation system to provide one or more services using the configuration information and a set of rules defining capabilities required to provide services.

9. The method of claim 8, wherein the configuring performed by the configuration engine comprises:
determining capabilities of each individual hardware element of the home automation system;
accumulating ordered lists of available capabilities along connection paths through hardware elements of the home automation system; and
comparing accumulated ordered lists with the set of rules defining capabilities required to provide services.

10. The method of claim 9, wherein the configuring performed by the configuration engine further comprises:
based on matches from the comparing, determining a list of possible services that can be provided by the home automation system.

11. The method of claim 10, wherein the configuring performed by the configuration engine further comprises:
filtering the list of possible services based on user preferences, to produce a final list of services; and
storing information regarding the services of the final list of services in the home database.

12. A method for operating a home automation system comprising:
maintaining, at a host controller of the home automation system of a home that communicates with and issues control commands to a plurality of hardware elements of the home automation system, a home database that stores at least one of configuration information used for providing services involving one or more hardware elements of the home automation system, scenes that are configured to use one or more hardware elements of the home automation system, or system state information indicating a present condition of one or more hardware elements of the home automation system;
synchronizing the home database with a configuration database of cloud services over the Internet;
detecting the host controller has been reset or replaced; and
restoring the home database of the reset or replaced host controller in the home by synchronizing the configuration database of the cloud services with the home database over the Internet.

13. The method of claim 12, further comprising:
when a mobile device executing a mobile application (app) used to configure and/or control the home automation system by causing the host controller to issue control commands, is located in the home, performing data interactions related to the home automation system between the mobile app and the host controller over an in-home local area network (LAN).

14. The method of claim 13, further comprising:
when the mobile device executing the mobile app is located remote from the home, performing data interactions related to the home automation system between the mobile app and the cloud services over the Internet.

15. A mobile device configured to operate with a home automation system, comprising:
a touch sensitive display screen;
a processor; and
a memory storing software that is executable on the processor, the software including a mobile application (app) that when executed is operable to:
establish a connection over an in-home local area network (LAN) between the mobile app and a host controller of the home automation system that communicates with and issues control commands to a plurality of hardware elements of the home automation system and maintains a home database,
establish a connection between the mobile app and cloud services that maintain a configuration database synchronized with the home database over the Internet,
receive in a configuration user interface (UI) of the mobile app user-provided configuration information for one or more hardware elements of the home automation system, and provide the configuration information to the host controller over the in-home LAN to build a system configuration in the home database,
when there is connectivity between the mobile app and the host controller via the in-home LAN, perform data interactions related to the system configuration between the mobile app and the host controller over the in-home LAN, and
when there is no connectivity between the mobile app and the host controller via the in-home LAN, perform data interactions related to the system configuration between the mobile app and the cloud services over the Internet.

16. The mobile device of claim 15, wherein the data interactions include providing control commands from the mobile app that cause the host controller to issue control commands to one or more hardware elements of the home automation system.

17. The mobile device of claim 15, wherein the data interactions include defining one or more scenes that are configured to use one or more hardware elements of the home automation system.

18. The mobile device of claim 15, wherein the data interactions include receiving state change notifications at the mobile app describing a change in condition of one or more hardware elements of the home automation system.

19. The mobile device of claim 15, the data interactions include retrieving information for display in a home automation control user interface (UI) of the mobile app.

20. The mobile device of claim 15, wherein the configuration information includes at least one of a room with which a hardware element is associated or one or more interconnections of the hardware element to other hardware elements.

* * * * *